US012265259B2

United States Patent
Israel et al.

(10) Patent No.: US 12,265,259 B2
(45) Date of Patent: Apr. 1, 2025

(54) WAVEGUIDE MODE COUPLING

(71) Applicant: Teramount Ltd., Jerusalem (IL)

(72) Inventors: Abraham Israel, Jerusalem (IL); Hesham Taha, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 0 days.

(21) Appl. No.: 16/814,401

(22) Filed: Mar. 10, 2020

(65) Prior Publication Data
US 2021/0003777 A1      Jan. 7, 2021

Related U.S. Application Data

(60) Provisional application No. 62/795,837, filed on Jan. 23, 2019.

(51) Int. Cl.
  *G02B 6/122*    (2006.01)
  *G02B 6/14*     (2006.01)
  *G02B 6/12*     (2006.01)

(52) U.S. Cl.
  CPC ............ *G02B 6/14* (2013.01); *G02B 6/1228* (2013.01); *G02B 2006/12061* (2013.01)

(58) Field of Classification Search
  CPC ..................................................... G02B 6/305
  See application file for complete search history.

(56) References Cited

U.S. PATENT DOCUMENTS

| | | | |
|---|---|---|---|
| 4,744,618 A | 5/1988 | Mahlein | |
| 4,763,977 A | 8/1988 | Kawasaki et al. | |
| 5,627,931 A | 5/1997 | Ackley et al. | |
| 5,913,002 A | 6/1999 | Jiang | |
| 5,939,782 A | 8/1999 | Malladi | |
| 6,052,397 A * | 4/2000 | Jeon | H01S 5/164 372/46.01 |
| 6,122,417 A | 9/2000 | Jayaraman et al. | |
| 6,198,864 B1 | 3/2001 | Lemoff et al. | |
| 6,253,009 B1 * | 6/2001 | Lestra | G02B 6/305 257/E33.068 |

(Continued)

FOREIGN PATENT DOCUMENTS

| | | |
|---|---|---|
| CA | 1253377 A | 5/1989 |
| CN | 1387626 A | 12/2002 |

(Continued)

OTHER PUBLICATIONS

International Search Report and Written Opinion of International Searching Authority for PCT/IB2021/062224, ISA/IL, Jerusalem, Israel, Dated: Mar. 17, 2022.

(Continued)

*Primary Examiner* — Eric Wong
(74) *Attorney, Agent, or Firm* — Banner & Witcoff, Ltd.

(57) ABSTRACT

An optical mode coupler for mode coupling of waveguides. The optical mode coupler includes an oxide cladding layer, a waveguide channel formed on the oxide cladding layer, and a waveguide portion formed on the oxide cladding layer and partially enclosed by the waveguide channel on an end of the waveguide portion. The waveguide portion has a tapered region located on the end of the waveguide portion. The tapered region has a dual-plane tapering arrangement extending from the waveguide portion towards the waveguide channel for enhanced mode transformation efficiency.

23 Claims, 3 Drawing Sheets

(56) References Cited

U.S. PATENT DOCUMENTS

| | | |
|---|---|---|
| 6,271,970 B1 | 8/2001 | Wade |
| 6,423,956 B1 | 7/2002 | Mandella et al. |
| 6,571,039 B1* | 5/2003 | Al-hemyari ............ G02B 6/1228 385/132 |
| 6,600,845 B1 | 7/2003 | Feldman et al. |
| 6,654,533 B1 | 11/2003 | Koteles et al. |
| 6,801,693 B1 | 10/2004 | Jacobowitz et al. |
| 6,832,031 B2 | 12/2004 | Smaglinski |
| 6,862,092 B1 | 3/2005 | Ibsen et al. |
| 6,888,988 B2 | 5/2005 | Vancoille et al. |
| 6,941,047 B2 | 9/2005 | Capewell et al. |
| 6,960,031 B2 | 11/2005 | McFarland et al. |
| 7,050,304 B2 | 5/2006 | Hsu et al. |
| 7,058,275 B2 | 6/2006 | Sezerman et al. |
| 7,104,703 B2 | 9/2006 | Nagasaka et al. |
| 7,139,448 B2 | 11/2006 | Jain et al. |
| 7,260,328 B2 | 8/2007 | Kropp |
| 7,288,756 B2 | 10/2007 | Sherrer et al. |
| 7,317,746 B2 | 1/2008 | Ericson et al. |
| 7,358,109 B2 | 4/2008 | Gallup et al. |
| 7,366,380 B1 | 4/2008 | Peterson et al. |
| 7,447,404 B2 | 11/2008 | Miller |
| 7,567,391 B1 | 7/2009 | Strauch, III et al. |
| 7,729,581 B2 | 6/2010 | Rolston et al. |
| 7,853,101 B2 | 12/2010 | Carothers |
| 7,970,041 B2 | 6/2011 | Arimoto et al. |
| 8,000,565 B2 | 8/2011 | Liu |
| 8,117,982 B2 | 2/2012 | Gruber et al. |
| 8,390,806 B1 | 3/2013 | Subramanian |
| 8,422,836 B2 | 4/2013 | Riester et al. |
| 8,471,467 B2 | 6/2013 | Boerner |
| 8,548,287 B2 | 10/2013 | Thacker et al. |
| 8,582,934 B2 | 11/2013 | Adler et al. |
| 8,803,269 B2 | 8/2014 | Shastri et al. |
| 8,834,146 B2 | 9/2014 | Saha et al. |
| 8,836,942 B2 | 9/2014 | Quan et al. |
| 8,929,693 B2 | 1/2015 | Shin et al. |
| 9,039,304 B2 | 5/2015 | Ko et al. |
| 9,099,581 B2 | 8/2015 | Na et al. |
| 9,285,554 B2 | 3/2016 | Doany et al. |
| 9,429,725 B2 | 8/2016 | Shao et al. |
| 9,442,255 B2 | 9/2016 | Pommer et al. |
| 9,496,248 B2 | 11/2016 | Lee et al. |
| 9,500,821 B2 | 11/2016 | Hochberg et al. |
| 9,563,028 B2 | 2/2017 | Contag |
| 9,658,396 B2 | 5/2017 | Rong et al. |
| 9,698,564 B1 | 7/2017 | Shubin et al. |
| 9,703,041 B2 | 7/2017 | Smith et al. |
| 9,739,962 B2 | 8/2017 | Brenner et al. |
| 9,791,645 B2 | 10/2017 | Meadowcroft et al. |
| 9,804,334 B2 | 10/2017 | Israel et al. |
| 9,804,348 B2 | 10/2017 | Badihi et al. |
| 9,864,133 B2 | 1/2018 | Patel et al. |
| 9,874,688 B2 | 1/2018 | Doerr et al. |
| 9,946,028 B2 | 4/2018 | Chen et al. |
| 10,054,740 B2* | 8/2018 | Chetrit ...................... H01P 3/16 |
| 10,069,279 B2 | 9/2018 | Malcolm et al. |
| 10,222,552 B2 | 3/2019 | Djordjevic et al. |
| 10,481,334 B2 | 11/2019 | Israel et al. |
| 10,502,905 B1 | 12/2019 | Mathai et al. |
| 10,641,953 B1 | 5/2020 | Vashishtha et al. |
| 10,746,934 B2 | 8/2020 | Patel et al. |
| 10,754,107 B2 | 8/2020 | Li et al. |
| 10,866,363 B2 | 12/2020 | Israel et al. |
| 11,394,468 B2 | 7/2022 | Zhou et al. |
| 11,448,836 B2 | 9/2022 | Ji et al. |
| 11,585,991 B2 | 2/2023 | Israel et al. |
| 11,863,917 B2 | 1/2024 | Meister et al. |
| 2002/0079430 A1 | 6/2002 | Rossi |
| 2002/0118907 A1 | 8/2002 | Sugama et al. |
| 2002/0131180 A1 | 9/2002 | Goodman |
| 2002/0150320 A1 | 10/2002 | Kato |
| 2002/0164129 A1 | 11/2002 | Jackson |
| 2003/0002809 A1 | 1/2003 | Jian |
| 2003/0043157 A1 | 3/2003 | Miles |
| 2003/0044118 A1* | 3/2003 | Zhou .................... G02B 6/1228 385/43 |
| 2003/0142896 A1 | 7/2003 | Kikuchi et al. |
| 2003/0222282 A1 | 12/2003 | Fjelstad et al. |
| 2004/0114869 A1* | 6/2004 | Fike ........................ G02B 6/124 385/43 |
| 2004/0144869 A1* | 7/2004 | Hennessy .............. B05B 1/3053 239/583 |
| 2004/0184704 A1 | 9/2004 | Bakir et al. |
| 2005/0025430 A1 | 2/2005 | Bhagavatula et al. |
| 2005/0162853 A1 | 7/2005 | Jain |
| 2005/0164131 A1 | 7/2005 | Yokouchi |
| 2005/0276613 A1 | 12/2005 | Welch et al. |
| 2006/0022289 A1 | 2/2006 | Badhei et al. |
| 2006/0239605 A1 | 10/2006 | Palen et al. |
| 2006/0251360 A1 | 11/2006 | Lu et al. |
| 2006/0280402 A1 | 12/2006 | Xia et al. |
| 2006/0285797 A1* | 12/2006 | Little .................... G02B 6/1228 385/28 |
| 2007/0103682 A1 | 5/2007 | Yoo |
| 2007/0160321 A1 | 7/2007 | Wu et al. |
| 2007/0223540 A1 | 9/2007 | Sudmeyer et al. |
| 2009/0178096 A1 | 7/2009 | Menn et al. |
| 2009/0262346 A1 | 10/2009 | Egloff et al. |
| 2009/0297093 A1* | 12/2009 | Webster .............. G02B 6/1228 264/1.25 |
| 2010/0002987 A1 | 1/2010 | Hata et al. |
| 2010/0086255 A1* | 4/2010 | Ishizaka ................ G02B 6/13 216/51 |
| 2011/0032598 A1 | 2/2011 | Horikawa et al. |
| 2011/0091167 A1 | 4/2011 | Nishimura |
| 2011/0170825 A1* | 7/2011 | Spector .................. G02B 6/136 385/43 |
| 2011/0280573 A1 | 11/2011 | Collings et al. |
| 2011/0293281 A1 | 12/2011 | Sakurai |
| 2012/0002284 A1 | 1/2012 | McColloch et al. |
| 2012/0063721 A1 | 3/2012 | Chen |
| 2012/0280344 A1 | 11/2012 | Shastri et al. |
| 2013/0044977 A1 | 2/2013 | Amit |
| 2013/0109083 A1 | 5/2013 | Llobera Adan |
| 2013/0129281 A1 | 5/2013 | Son et al. |
| 2013/0156370 A1* | 6/2013 | Kim ........................ G02B 6/305 385/14 |
| 2013/0182998 A1 | 7/2013 | Andry et al. |
| 2013/0209026 A1 | 8/2013 | Doany et al. |
| 2013/0216180 A1 | 8/2013 | Tan et al. |
| 2014/0023098 A1 | 1/2014 | Clarkson et al. |
| 2014/0064559 A1 | 3/2014 | Sugasawa et al. |
| 2014/0176958 A1 | 6/2014 | Flanders et al. |
| 2014/0203175 A1 | 7/2014 | Kobrinsky et al. |
| 2014/0226988 A1 | 8/2014 | Shao et al. |
| 2014/0294342 A1 | 10/2014 | Offrein et al. |
| 2014/0363165 A1 | 12/2014 | Panotopoulos et al. |
| 2015/0036704 A1 | 2/2015 | Daiber |
| 2015/0050019 A1 | 2/2015 | Sengupta |
| 2015/0124336 A1 | 5/2015 | Kaufman |
| 2015/0125110 A1 | 5/2015 | Anderson et al. |
| 2015/0155423 A1 | 6/2015 | Matsuoka et al. |
| 2016/0109659 A1 | 4/2016 | Jiang |
| 2016/0119064 A1 | 4/2016 | Yamaji et al. |
| 2016/0131848 A1 | 5/2016 | Svilans |
| 2016/0161686 A1 | 6/2016 | Li et al. |
| 2016/0195677 A1 | 7/2016 | Panotopoulos et al. |
| 2016/0225477 A1 | 8/2016 | Banine et al. |
| 2016/0246004 A1 | 8/2016 | Kachru et al. |
| 2016/0306117 A1* | 10/2016 | Middlebrook .......... G02B 1/045 |
| 2016/0377821 A1 | 12/2016 | Vallance et al. |
| 2017/0017042 A1 | 1/2017 | Menard et al. |
| 2017/0017043 A1 | 1/2017 | Menard et al. |
| 2017/0102503 A1 | 4/2017 | Israel et al. |
| 2017/0131469 A1 | 5/2017 | Kobrinsky et al. |
| 2017/0160481 A1* | 6/2017 | Ling ........................ G02B 6/305 |
| 2017/0207600 A1 | 7/2017 | Klamkin et al. |
| 2017/0294760 A1 | 10/2017 | Shubin et al. |
| 2018/0031791 A1 | 2/2018 | Israel et al. |
| 2018/0045891 A1 | 2/2018 | Israel et al. |
| 2018/0061691 A1 | 3/2018 | Jain et al. |
| 2018/0180829 A1 | 6/2018 | Gudeman |

(56) References Cited

U.S. PATENT DOCUMENTS

| | | |
|---|---|---|
| 2018/0217341 A1 | 8/2018 | Smith et al. |
| 2018/0259710 A1 | 9/2018 | Stabile et al. |
| 2018/0364426 A1 | 12/2018 | Ten Have et al. |
| 2019/0146162 A1 | 5/2019 | Evans |
| 2019/0170937 A1 | 6/2019 | Menezo et al. |
| 2019/0265421 A1 | 8/2019 | Ji et al. |
| 2019/0324211 A1 | 10/2019 | Israel et al. |
| 2019/0339450 A1 | 11/2019 | Noriki et al. |
| 2020/0278508 A1 | 9/2020 | Israel et al. |
| 2020/0326491 A1 | 10/2020 | Psaila et al. |
| 2020/0357721 A1 | 11/2020 | Sankman et al. |
| 2021/0149128 A1 | 5/2021 | Schaevitz et al. |
| 2021/0165165 A1 | 6/2021 | Israel et al. |
| 2021/0239920 A1 | 8/2021 | Vallance et al. |
| 2021/0263216 A1 | 8/2021 | Bishop et al. |
| 2021/0392419 A1 | 12/2021 | Meister et al. |
| 2022/0026649 A1 | 1/2022 | Vallance et al. |
| 2022/0226649 A1 | 7/2022 | Shalev et al. |
| 2022/0299705 A1 | 9/2022 | Dunphy et al. |
| 2022/0390693 A1 | 12/2022 | Krähenbühl et al. |
| 2022/0404546 A1 | 12/2022 | Krichevsky et al. |
| 2023/0018654 A1 | 1/2023 | Winzer et al. |
| 2023/0021871 A1 | 1/2023 | Kuznia et al. |
| 2023/0030105 A1* | 2/2023 | Aalto ............... G02B 6/1228 |
| 2023/0043794 A1 | 2/2023 | Winzer et al. |
| 2023/0072926 A1 | 3/2023 | Morrison et al. |
| 2023/0077979 A1 | 3/2023 | Winzer |
| 2023/0079458 A1 | 3/2023 | Debergh et al. |
| 2023/0084003 A1 | 3/2023 | Taha et al. |
| 2023/0094780 A1 | 3/2023 | Testa et al. |
| 2023/0130045 A1 | 4/2023 | Taha et al. |
| 2023/0204876 A1 | 6/2023 | Krichevsky et al. |
| 2023/0288705 A1 | 9/2023 | Wang et al. |

FOREIGN PATENT DOCUMENTS

| | | |
|---|---|---|
| CN | 104459890 A | 3/2015 |
| EP | 2639978 A1 | 9/2013 |
| EP | 3316012 A1 | 5/2018 |
| EP | 3495861 A1 | 6/2019 |
| EP | 3521879 A1 | 8/2019 |
| EP | 4102273 A1 | 12/2022 |
| JP | 6462596 B2 | 1/2019 |
| KR | 20050007459 A | 1/2005 |
| KR | 20170081265 A | 7/2017 |
| RU | 2438209 C1 | 12/2011 |
| RU | 2485688 C2 | 6/2013 |
| RU | 2577669 C2 | 3/2016 |
| WO | 2001067497 A1 | 9/2001 |
| WO | 2013048730 A1 | 4/2013 |
| WO | 2018067703 A1 | 4/2018 |
| WO | 2018140057 A1 | 8/2018 |

OTHER PUBLICATIONS

Tom Mitcheltree and Stephen Hardy. "Optical Connectivity Considerations for Co-Packaged Optics". Time Stamp: 23:42. May 6, 2021. https://event.webcasts.com/viewer/event.jsp?ei=1459224&tp_key=61326889cd.

USCONEC. "13950, Ferrule, Prizm®LT 12F MM" https://www.usconec.com/products/ferrule-prizm-lt-12f-mm.

USCONEC. "15214, Mechanical Optical Interface (MOI) 10+ Gbps, Prizm® LightTurn@". https://www.usconec.com/products/mechanical-optical-interface-moi-10plus-gbps-prizm-lighttum.

USCONEC. "15215, Prizm®LightTurn® Mini HOusing" https://www.usconec.com/products/prizm-lightturn-mini-housing.

USCONEC. "16349, Ferrule, Prizm®LT 8F SM" https://www.usconec.com/products/ferrule-prizm-lt-8f-sm.

USCONEC. "Product Catalog" pp. 69 and 70. https://www.usconec.com/umbraco/rhythm/protectedfilesapi/download?path=%2ffiles%2fLiterature%2fUS_Conec_Product_catalog.pdf.

USCONEC. Mechanical Optical Interface Customer Drawings. https://www.usconec.com/umbraco/rhythm/protectedfilesapi/download?path=%2ffiles%2fdrawings%2fC15214.pdf.

Barwicz, et al., "Assembly of Mechanically Compliant Interfaces Between Optical Fibers and Nanophotonic Chips", IEEE 64th Electronics Components and Technology Conference, Orlando, FL., May 27-30, 2014.

Bogaerts, "Helios Lecture: Coupling Light to Silicon Photonic Circuits", Silicon Photonics—PhD Course prepared within FP7-224312 Helios Project, Ghent University—IMECGhent, Belgium, Nov. 2009.

Camapa, CD-ROM, pp. 58, 59, 79, Russia, 2012.

Chrical Photonics., "Fiber Coupler Overview", Pinebrook, NJ, Jan. 2013.

Cunningham, et al., "Aligning Chips Face-to-Face for Dense Capacitive and Optical Communications", IEEE Transactions on Advanced Packaging, vol. 33, No. 2, May 2010.

First Chinese Foreign Office Action for Chinese Application No. 201980025948.3, Chinese National Intellectual Property Administration (CNIPA), Beijing City, China, Dated: Nov. 15, 2021.

Foreign Office Action and Search Report for ROC (Taiwan) Patent Application No. 105121625 dated Sep. 5, 2017 from IPO (Intellectual Property Office) of Taiwan.

Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.

International Search Report and Written Opinion of Internationl Searching Authority for PCT/US2019/027871, ISA/RU, Moscow, Russia, Dated: Aug. 22, 2019.

Kopp, et al., "Silicon Photonic Circuits: On-CMOS Integration, Fiber Optical Coupling, and Packaging", IEEE Journal of Selected Topics in Quantum Electronics, Aug. 2010.

Kurata, et al., "Prospect of Chip Scale Silicon Photonics Transceiver for High Density Multi-mode Wiring System", Photonics Electronics Technology Research Association (PETRA), Japan, 2015, pp. 1-7.

Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.

Notice of Deficiencies for EP Application No. 16854021.9 dated Jun. 24, 2019, EPO, Rijswijk, Netherlands.

O'Brien, "Silicon Photonics Fiber Packaging Technology", Photonics Packaging Group, Tyndall National Institute, Cork, Ireland, Sep. 2012.

PCL Connections LLC, all rights reserved, "In-Line Coupling Element (ICE) for Bonded Grating Coupling to Silicon PICs", Columbus, OH., May 2013.

The European Search Report for EP Application No. 16854021.9 dated Aug. 21, 2018, EPO, The Hague.

The First Chinese Office Action for Chinese Patent Application No. 2016800557192, Aug. 22, 2019, China, CNIPA.

The International Search Report and The Written Opinion for PCT/US2016/038047, ISA/RU, Moscow, Russia, Date of Mailing: Oct. 13, 2016.

The International Search Report and The Written Opinion for PCT/US2017/055146, ISA/RU, Moscow, Russia, Date of Mailing: Jan. 31, 2018.

Zimmerman, "State of the Art and Trends in Silicon Photonics Packaging", Silicon Photonics Workshop, Technische Universitat Berlin, May 2011.

Second Chinese Foreign Office Action for Chinese Application No. 2019800259483, Chinese National Intellectual Property Administration (CNIPA), Beijing City, China, Dated: May 31, 2022.

Noriki et al., "45-degree curved micro-mirror for vertical optical I/O of silicon photonics chip," Optics Express, vol. 27, No. 14, Dated: Jul. 8, 2019.

The International Search Report and the Written Opinion for PCT Application No. PCT/IL2022/051131, ISA/IL dated Jan. 12, 2023.

Miller, David "Self-aligning optics for integrated mode separation," Standfor University, IEEE 2015.

Francis, David G. "Laser Instrumentation in AEDC Test Facilities," Arnold Engineering Development Center, Dec. 1971.

(56) References Cited

OTHER PUBLICATIONS

McLaughlin, Dennis K. "Laser Doppler Velocmeter Measurements in a Turbulent Jet Exiting into a Cross Flow," Arnold Engineering Development Center, Jan. 1972.
The International Search Report and the Written Opinion for PCT Application No. PCT/IL2022/051360, ISA/IL dated Mar. 5, 2023.
The International Search Report and the Written Opinion for PCT Application No. PCT/IL2022/051358, ISA/IL dated Apr. 2, 2023.
Notice of Preliminary Rejection dated Jul. 19, 2023 for KR Application No. 10-2018-7007767.
Doerr et al. Silicon photonic integrated circuit for coupling to a ring-core multimode fiber for space-division mutliplexing. Bell Laboratories. ECOC Postdeadline Papers. 2011 OSA. (Year: 2011).
The International Search Report and the Written Opinion for PCT Application No. PCT/IL2023/051163, ISA/IL dated Jan. 11, 2024.

\* cited by examiner

WAVEGUIDE MODE COUPLING

CROSS-REFERENCE TO RELATED APPLICATION

This application claims the benefit of U.S. Provisional Application No. 62/795,837, filed on Jan. 23, 2019, the contents of which are hereby incorporated by reference.

TECHNICAL FIELD

The present disclosure relates generally to optical waveguides, and more specifically to mode coupling between low index and high index waveguides.

BACKGROUND

Communications systems and data centers are required to handle massive data at ever increasing speeds and ever decreasing costs. To meet these demands, optical fibers and optical Integrated Circuits (ICs), such as, a Photonic Integrated Circuit (PIC) or integrated optical circuit are used together with high speed electronic ICs. A PIC is a device that integrates multiple photonic functions (similar to an electronic IC or Radio Frequency (RF) IC). PICs are typically fabricated using indium phosphide or silicon oxide (SiO2), which allows for the integration of various optically active and passive functions on the same circuit.

The coupling of PICs to optical fibers is not as well advanced as the integration and/or coupling of electronic ICs. Specifically, the challenges facing optical connections are different and much more complex than connecting electronic ICs to, for example, a Printed Circuit Board (PCB). Some difficulties are inherent in wavelength, signal losses, assembly tolerance, and polarization characteristics of optical packaging.

A major challenge in the design and fabrication of PICs is maintaining efficient coupling between compact surface waveguides and external optic devices (e.g., a fiber or laser element).

In particular, mode coupling remains a challenge for waveguides of submicro-meter dimensions made in high index contrast materials, such as semiconductors. High coupling loss arises when coupling the lightwaves (modes) between two waveguides having different index differences, which is due to the difference in the mode size, shape, and mode velocity. This coupling loss becomes especially pronounced when the fiber optic waveguide is coupled to a high index difference planar waveguide.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an optical mode coupler. The coupler includes an oxide cladding layer, a waveguide channel formed on the oxide cladding layer, and a waveguide portion formed on the oxide cladding layer and partially enclosed by the waveguide channel on an end of the waveguide portion. The waveguide portion having a tapered region located on the end of the waveguide portion.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1A:
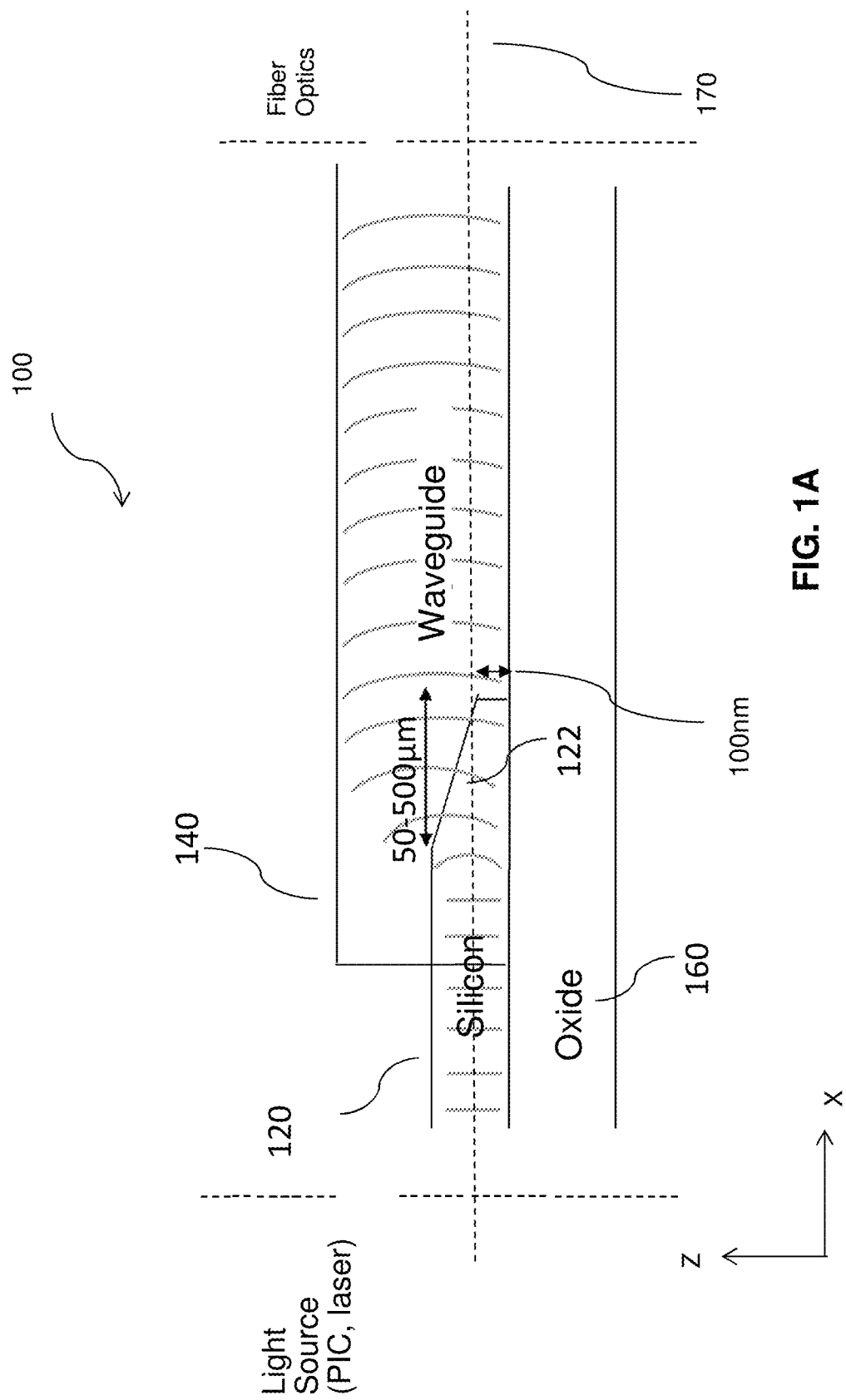
FIG. 1A is a schematic side view of an optical mode coupler, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It is an object of the present invention to provide a mode coupling structure that enhances mode transformation efficiency between waveguides in comparison with conventional devices. It has been identified that tapering in at least two planes may improve light transfer losses that occur in optical signal transmission through waveguides having different refractive indices. Also, the amount of tapering in the waveguides may also affect the light transfer efficiency of the waveguides.

FIG. 1A is an example side view illustrating the arrangement of an optical mode coupler 100 according to an embodiment. The optical mode coupler 100 includes a waveguide portion 120 and a tapered region 122, a waveguide channel 140 with a low refractive index that is lower than the refractive index of the waveguide portion 120, and an oxide cladding layer 160.

The waveguide portion 120 is formed on the oxide cladding layer 160, and is used to extract light beams (optical signals) from a light source such as a laser light source (not shown) or from a Photonic Integrated Circuit (PIC) (not shown) to the waveguide channel 140.

An example optical arrangement of the light source including the PIC and the laser light source may be found in Patent Application Publication No. US 2018/0045891, and US20180031791, each of which are herein incorporated by reference in their entirety and assigned to the common assignee.

The waveguide channel 140, which is also formed on the oxide cladding layer 160, is not tapered, and can be made of, for example, a polymer (e.g., polyimide) or nitrides such as a silicon nitride, silicon oxynitride, or similar materials with suitably low refractive index. Having low refractive index allows the waveguide channel 140 to expand the optical signals readily once it is received from the waveguide portion 120 and passed to the fiber optics, which may be arranged as an array, For example, the waveguide channel 140 may the extracted light beam received from the waveguide portion 120 from less than 1 micron to 3-5 microns.

The waveguide portion 120 can be made of silicon, or another material with similar refractive characteristics. The waveguide portion 120 is partially enclosed by the waveguide channel 140 on an end of the waveguide portion 120. The tapered region 122 is located within the part of the waveguide portion 120 enclosed by the waveguide channel 140.

The tapered region 122 has a dual-plane tapering arrangement extending from the waveguide portion 120 towards the waveguide channel 140. In an embodiment, and as shown in FIG. 1A, the dual-plan tapering arrangements includes the tapered region 122 having a "vertical" tapered region, in which, when viewing in an X-Z plane, the tapered region 122 of the waveguide portion 120 is tapered in a Z-direction that is perpendicular to an axis 170 along the length of the waveguide portion 120 in the X-Z plane. Reducing the height in the Z-direction improves the symmetry between the two polarizations allowed in the waveguide portion 120, which enhances polarization independent coupling efficiency. Also, having a gradually tapered waveguide portion 120 avoids excessive light signal loss and back reflection that may occur from untampered waveguides.

In an embodiment, the length of the taper region 122 can be between 50 microns and 500 microns. Further, the Z-taper can end at a set height above the cladding oxide layer 160 (e.g., 100 nm).

Figure 1B:
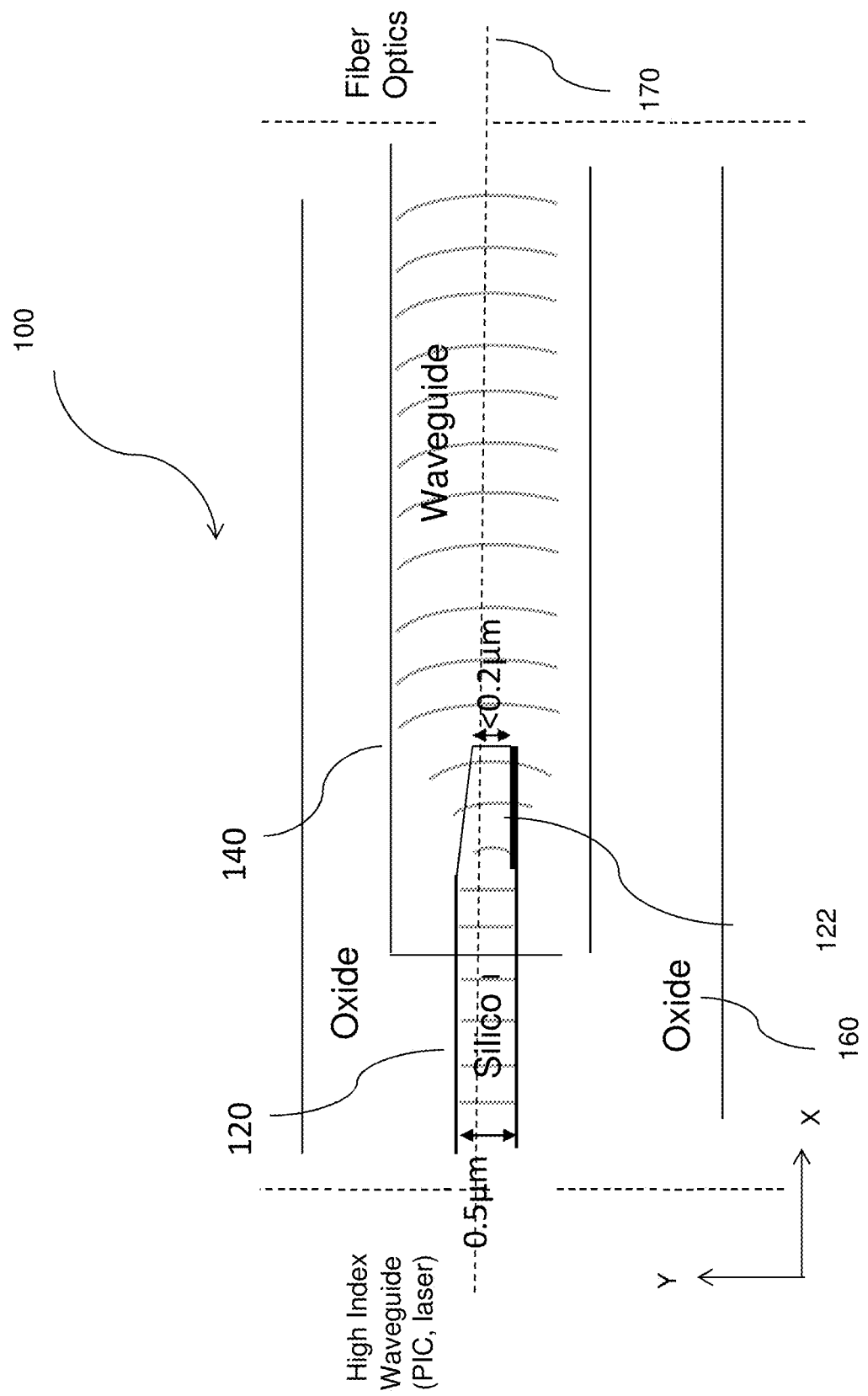
FIG. 1B is a schematic top view arrangement of the optical mode coupler, according to an embodiment.

FIG. 1B is an example schematic top view arrangement of the optical mode coupler 100, according to an embodiment. In addition to being tapered in vertical direction in forming the tapered region 122 as illustrated in FIG. 1A), the waveguide portion 120 simultaneously narrows down horizontally in a Y-direction that is perpendicular to the axis 170, along the length of waveguide portion 120 in an X-Y plane that is perpendicular to the X-Z plane shown in FIG. 1A.

In an embodiment, the waveguide portion 120 may be tapered from two width ends of the waveguide portion 120, so that the width of the waveguide portion 120 converges on the axis 170, with the axis 170 serving as the centerline axis of the length of the waveguide portion 120 in the X-Y plane.

As shown in FIG. 1B, the horizontal tapering of the waveguide portion 120 in the X-Y plane allows the width of the waveguide portion to decrease from around 0.5 microns to less than 0.2 microns, as shown in FIG. 2B (the "inverse taper").

Figure 2:
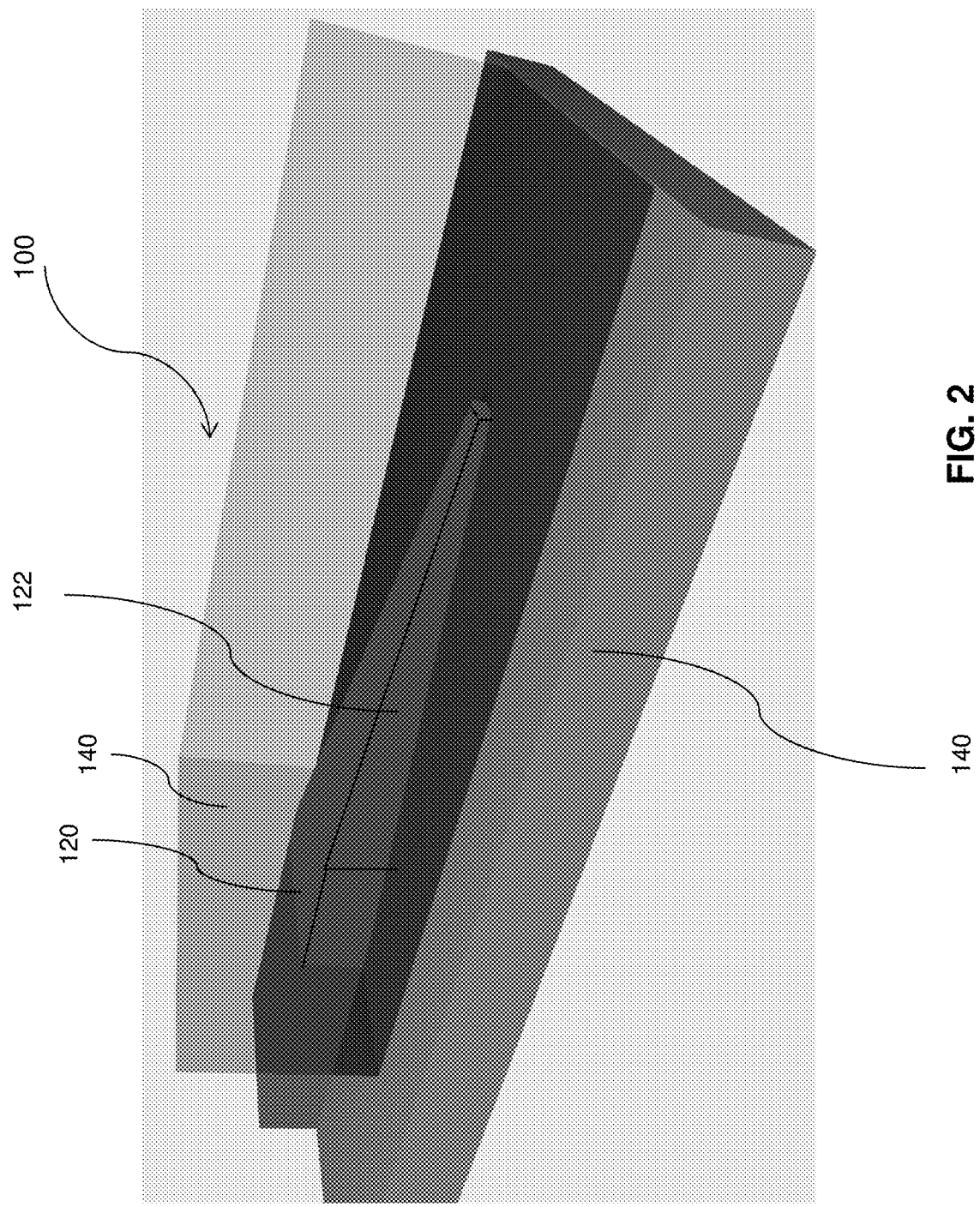
FIG. 2 is a three-dimensional perspective view of the optical mode coupler, according to the embodiment.

The dual-plane tapering arrangement, as described by the combination of FIG. 1A and FIG. 1B, can be also seen in the perspective three-dimensional view of FIG. 2. The disclosed arrangement allows for efficient light transfer and minimal polarization-dependent losses. In addition, the disclosed arrangement increases tolerance limits with regard to the dimensions of the tip of the taper (it can be as little as less than 0.2 microns wide but more than 0.1 microns).

When compared to single-plane tapering, where tips of a waveguide are tapered to 0.1 microns to "squeeze" light out of the waveguide portion 120, the waveguides with the 0.1 micron, single-plane tapered tips are difficult to manufacture. In contrast, with the Z-planed taper in the dual-planed tapering arrangement, where the tips that have a width between 0.13-0.2 microns (the values of which depend on the height of the waveguide portion 120 with the Z-planed taper), same or better result may be achieved by the waveguide portion 120. At the same time, the tight fabrication tolerance required of 0.1 micron, single-planed tapering waveguides is relaxed.

That is, the disclosed embodiments provide an optical module that results in enhanced mode transformation efficiency between waveguides with different index difference (e.g., between a photonic integrated circuit (PIC) (e.g., a photonic chip such as laser) and optical fiber, while ensuring low signal losses and thermal stability. The optical mode coupler disclosed herein can be fabricated by a lithography process, such as grayscale photolithography, nanoimprint lithography, and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus, comprising:
   a first optical waveguide; and
   a second optical waveguide disposed partially within the first optical waveguide comprising:
      a first portion having a first cross-section, in a first plan view, having a first about trapezoidal configuration and a second cross-section, substantially orthogonal to the first cross-section in a second plan view, having a second about trapezoidal configuration,
   wherein the apparatus is configured to expand an optical signal propagating from the second optical waveguide to the first optical waveguide.

2. The apparatus of claim 1, wherein the first optical waveguide has a first index of refraction and the second optical waveguide has a second index of refraction that is greater than the first index of refraction.

3. The apparatus of claim 1, further comprising:
a substrate,
wherein the first optical waveguide is disposed proximate to the substrate, and the second optical waveguide is disposed at least partially on the substrate,
wherein the first cross-section has an about right trapezoidal configuration with one side substantially parallel to the substrate.

4. The apparatus of claim 1, wherein the first cross-section has about a first right trapezoidal configuration and the second cross-section has about a second right trapezoidal configuration.

5. The apparatus of claim 1, wherein the first cross-section has an about right trapezoidal configuration and the second cross-section has an about isosceles trapezoidal configuration.

6. The apparatus of claim 1, wherein the apparatus is configured to be an optical coupler configured to contract an optical signal received from the first optical waveguide.

7. The apparatus of claim 1, wherein the first optical waveguide has cross-sections in three dimensions, each cross-section having a quadrilateral configuration.

8. The apparatus of claim 1, wherein the second optical waveguide further comprises:
a second portion adjacent to the first portion, the second portion having substantially quadrilateral configuration in the first and second cross-sections, wherein the apparatus is configured to be an optical coupler configured to expand an optical signal received from the second portion of the second optical waveguide.

9. The apparatus of claim 1, wherein the first portion of the second optical waveguide has a length in a range of about 50 microns to about 500 microns.

10. The apparatus of claim 1, wherein the first cross-section having an about trapezoidal configuration comprises a long side, and a short side, the short side having a length of about 100 nanometers and substantially parallel to the long side.

11. The apparatus of claim 1, wherein the second cross-section comprises a long side, and a short side, the short side having a length in a range of about 0.5 microns to 0.2 microns and is substantially parallel to the long side.

12. An apparatus comprising:
a substrate;
a first optical waveguide disposed proximate to the substrate; and
a second optical waveguide disposed partially within the first optical waveguide and comprising:
a first side disposed at least partially on a surface of the substrate; and
a second side opposed to the first side, wherein a portion of the second side is tapered relative to the surface of the substrate, and wherein the first optical waveguide and the second optical waveguide are configured to expand an optical signal propagating from the second optical waveguide to the first optical waveguide.

13. The apparatus of claim 12, wherein the second optical waveguide further comprises:
a third side substantially perpendicular to the substrate; and
a fourth side opposed to the third side and substantially perpendicular to the substrate,
wherein a portion of the third side and a portion of the fourth side converge on each other.

14. The apparatus of claim 13, wherein the third side and the fourth side converge to a distance from each other in a range of about 0.2 micrometers to about 0.5 micrometers.

15. The apparatus of claim 12, wherein the first optical waveguide has a first index of refraction and the second optical waveguide has a second index of refraction that is greater than the first index of refraction.

16. The apparatus of claim 12, wherein the portion of the second side that is tapered, tapers to a distance of about 100 nanometers from the substrate.

17. The apparatus of claim 12, wherein the first optical waveguide has cross-sections in three dimensions, each cross-section having a quadrilateral configuration.

18. An apparatus comprising:
a first optical waveguide having a first index of refraction; and
a second optical waveguide disposed partially within the first optical waveguide, a portion of the second optical waveguide having a two-sided taper in a first dimension and a one-sided taper in a second dimension, wherein the second optical waveguide has a second index of refraction that is higher than the first index of refraction,
wherein the first optical waveguide and the second optical waveguide are configured to expand an optical signal propagating from the second optical waveguide to the first optical waveguide.

19. The apparatus of claim 18, wherein the first optical waveguide has cross-sections in three dimensions, each cross-section having a quadrilateral configuration.

20. The apparatus of claim 18, further comprising:
a substrate,
wherein the first optical waveguide is disposed proximate to the substrate, and the second optical waveguide is at least partially disposed on the substrate.

21. An apparatus comprising:
a substrate;
a first optical waveguide having a first index of refraction and at least partially disposed on a surface of the substrate; and
a second optical waveguide having a second index of refraction that is greater than the first index of refraction, wherein the second optical waveguide comprises:
a first portion having a first cross-section in a plan view having an about right trapezoidal configuration with one side about parallel to the surface of the substrate, and
wherein the second optical waveguide is disposed partially within the first optical waveguide,
wherein the first optical waveguide and the second optical waveguide are configured to expand an optical signal propagating from the second optical waveguide to the first optical waveguide.

22. An apparatus comprising:
a substrate;
a first optical waveguide, having a first index of refraction, disposed proximate to the substrate; and
a second optical waveguide having a second index of refraction that is higher than the first index of refraction, wherein the second optical waveguide comprises:
a first side disposed at least partially on a surface of the substrate; and
a second side, disposed partially within the first optical waveguide and opposed to the first side, wherein a portion of the second side is disposed at about an angle to the surface of the substrate, wherein the first optical waveguide and the second optical waveguide are configured to expand an optical signal propagating from the second optical waveguide to the first optical waveguide.

23. An apparatus comprising:
a first optical waveguide; and
a second optical waveguide disposed partially within the first optical waveguide and having:
    a first cross-section in a first plan view having a pentagonal configuration; and
a second cross-section in a second plan view having a hexagonal configuration,
    wherein the first optical waveguide and the second optical waveguide are configured to expand an optical signal propagating from the second optical waveguide to the first optical waveguide.

* * * * *